United States Patent

[11] 3,552,455

| [72] | Inventor | Gaston Pinat<br>5384 Jules Fournier St., Montreal-North,<br>Quebec, Canada |
|---|---|---|
| [21] | Appl. No. | 741,779 |
| [22] | Filed | July 1, 1968 |
| [45] | Patented | Jan. 5, 1971 |

[54] BANDMILLS MOUNTING AND FEED ROLL ASSEMBLY
5 Claims, 5 Drawing Figs.

[52] U.S. Cl. .................................................. 143/22, 83/201.13
[51] Int. Cl. ...................................................... B27b 15/08
[50] Field of Search ........................................... 143/17–22; 83/201, 201.13

[56] References Cited
UNITED STATES PATENTS

| 589,014 | 8/1897 | McDonough | 143/5 |
| 812,987 | 2/1906 | Garland | 143/5(1) |
| 922,855 | 5/1909 | Cleveland | 143/22 |

FOREIGN PATENTS

| 4,252 | 6/1893 | Sweden | 143/22 |

Primary Examiner—Donald R. Schran
Attorney—Pierre Lesperance

ABSTRACT: Means for mounting bandmills assemblies to form multiple bandmills machine units for use in sawing logs and lumber into cants or boards wherein the bandmills assemblies are slidably mounted in a cantilevered manner on two or four slideways fastened in a superposed position onto a supporting beam, whereby the bandmills assemblies are approached one another to a short distance and further including movable roll assemblies which can be approached close to the bandmills saw blades and retracted to allow removal of the saw blades from the wheels of the bandmills. The resulting mounting is easily and quickly installed in a sawmill.

INVENTOR
Gaston PINAT
BY
Pierre Espérance
PATENT AGENT

INVENTOR
Gaston PINAT
BY
Pierre Lespérance

PATENT AGENT

BANDMILLS MOUNTING AND FEED ROLL ASSEMBLY

The present invention relates to bandmills mounting and feed roll assembly used in sawmills for sawing logs or cants into boards.

Bandmills are becoming in general use for sawmill operation. These bandmills are generally mounted in pairs for slidable movement towards one another on a supporting surface, so as to enable sawing of boards of various thickness.

The logs or cants are fed and guided by feed roll assemblies upstream and downstream from the bandmills.

In known bandmills mountings of this type, the bases of the bandmills are slidably mounted on a steel plate horizontally fastened to a supporting frame.

Due to this arrangement, the base of the bandmills frame must be made in such a manner that it protrudes from the active run of the saw blade and, therefore, constitutes a limit to the minimum distance to which the active runs of the saw blades of the pairs of bandmills can be approached.

Furthermore, the base of the frame must be wide enough to provide proper support such that the distance between the feed rolls and the active runs of the bandmills, is such that proper guidance of the logs or cants is not always obtained.

It is therefore the general object of the present invention to provide bandmills mounting which will overcome the above-noted disadvantages.

A more specific object of the present invention resides in the provision of bandmills mounting which greatly simplifies and reduces the expenses of mounting slidable bandmills in sawmills.

Another object of the invention resides in the provision of bandmills mounting including a steel beam provided with previously machined slideways adapted to be supported at its ends across the path of the logs or cants to be sawn and on which at least a pair bandmills assemblies are mounted in cantilevered fashion, whereby the bandmills are ready for quick installation in the sawmill.

Another object of the invention resides in the fact that, due to the cantilevered mounting of the bandmills on the two or four ways fastened in a superposed position to the supporting beam, the same beam can be used to mount a pair of bandmills on each side thereof, considerably diminishing the expenses of mounting pairs of bandmills on different support surfaces.

Another object of the invention resides in the provision of bandmills mounting of the character described, associated with feed roll assemblies, themselves displaceable towards and away from the active runs of the saw blades and which can be positioned very close to the saw blades, due to the aforementioned cantilevered mounting of the bandmills frames.

The foregoing and other objects of the present invention will become more apparent during the following disclosure by referring to the drawings, in which:

FIG. 5 is a partial longitudinal section, similar to that of FIG. 3, but showing another manner of displacing the feed roll assemblies.

In the drawings, like reference characters indicate like elements throughout.

Figure 1:
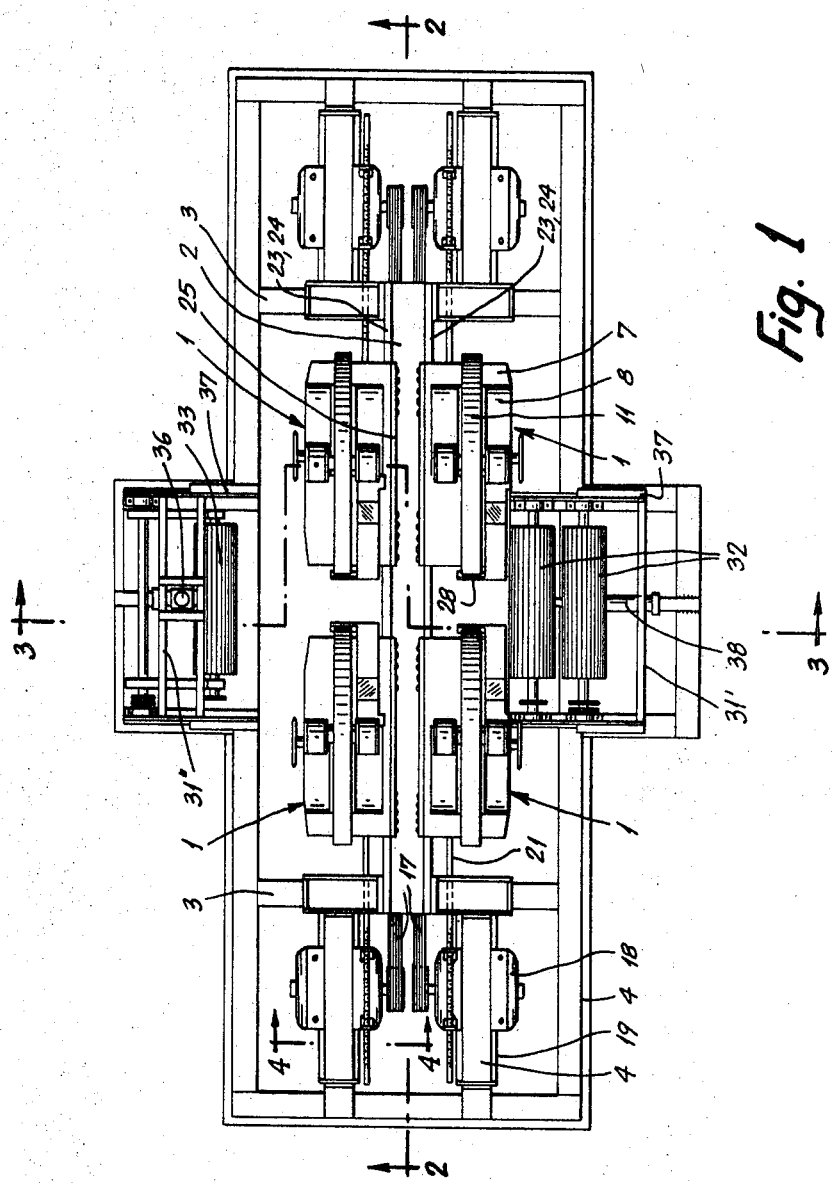
FIG. 1 is a top plan view of a mounting of four bandmills and infeed and outfeed rolls, said view being taken along line 1-1 of FIG. 3.

In the embodiment shown, there are two pairs of bandmills, generally indicated at 1, slidably mounted in cantilevered fashion on each side of a common support beam 2. This beam is horizontally disposed and supported at its ends on transverse I beams 3, themselves secured at their ends to a rectangular frame 4, I beams 3 being spaced from the ends of frame 4.

Frame 4 is in turn supported on concrete pillars or columns 5, for instance above floor level 6.

Each bandmill 1 comprises a frame including a base 7 and upstanding column 8 in which are adjustably mounted tubes 9 supporting bearings 10 for the top saw blade engaging wheel 11.

The frame of the bandmill extends below the beam 2 and carries bearings 12 for the drive shaft 13 of the lower saw blade engaging wheel 14.

Figure 2:
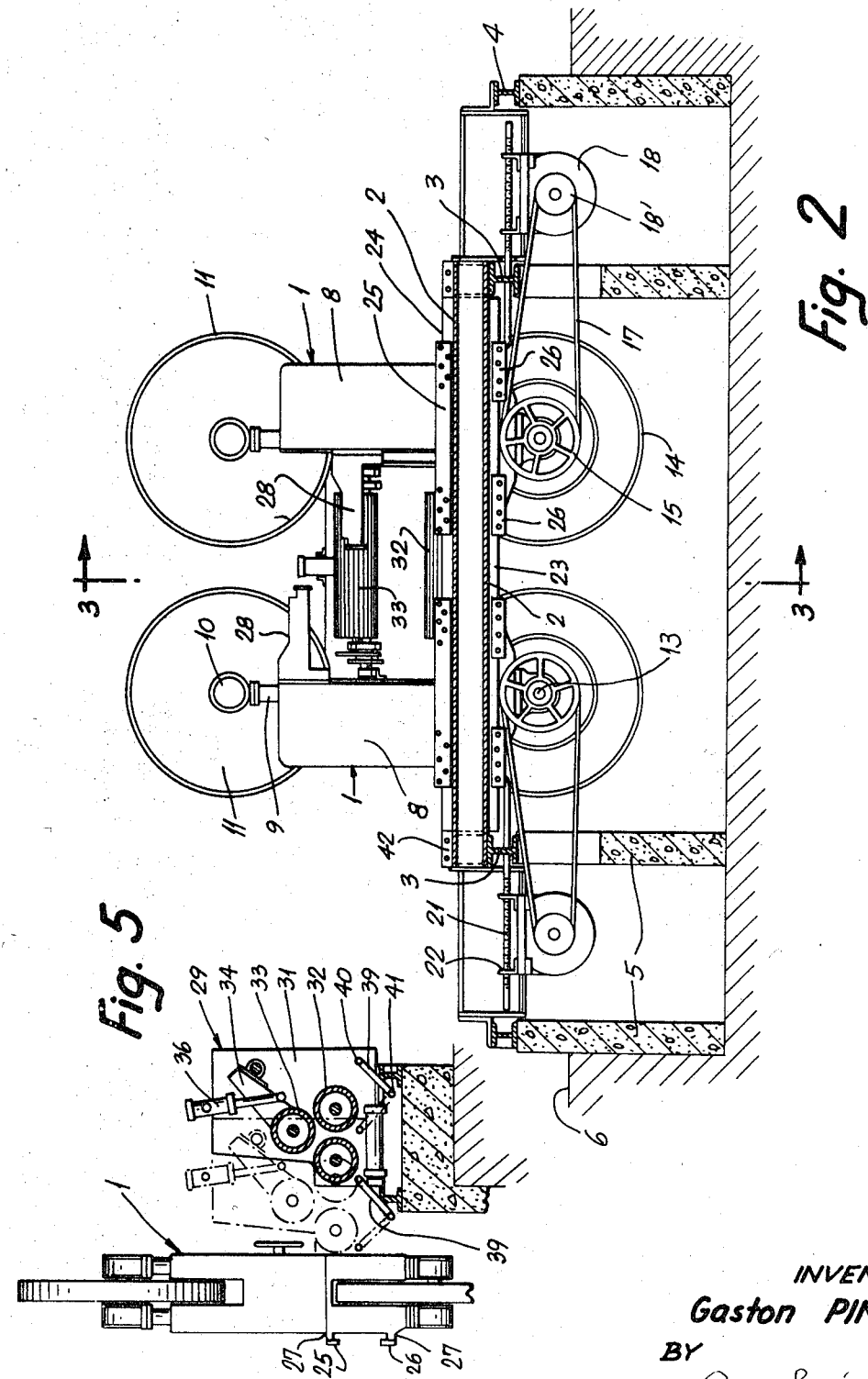
FIG. 2 is a longitudinal section of the assembly, taken along the line 2-2 of FIG. 1.
Figure 3:
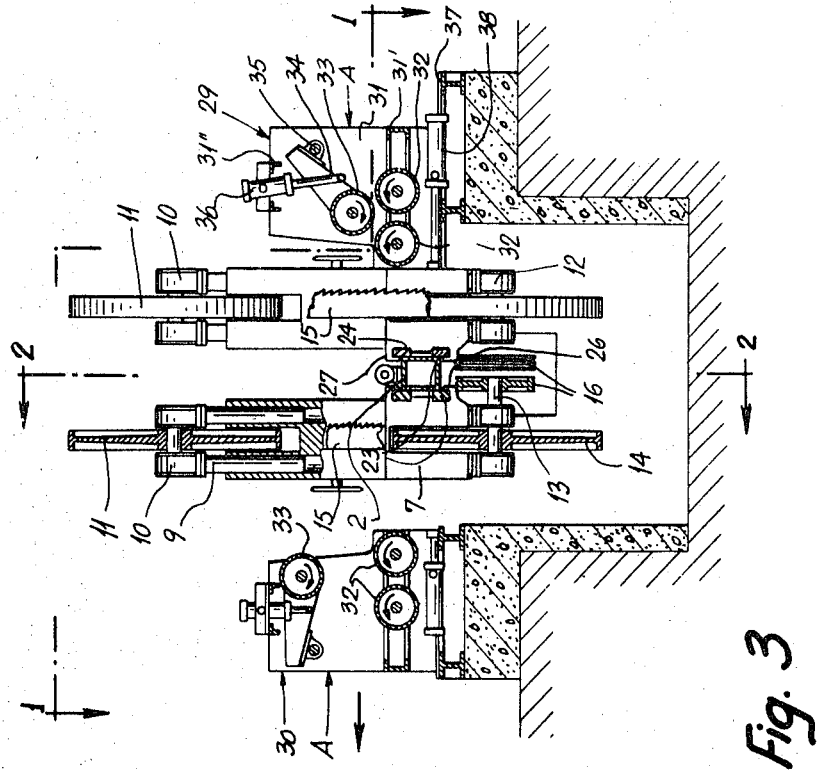
FIG. 3 is a cross section taken along line 3-3 of FIG. 1.
Figure 4:
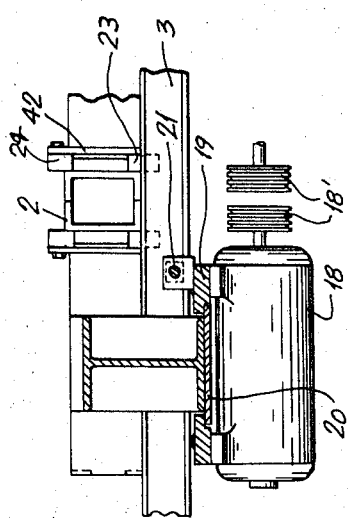
FIG. 4 is a section of the assembly of the driving motor for one bandmill, said section being taken along line 4-4 of FIG. 1.

FIG. 3 shows a portion of the endless saw blade 15 surrounding the wheels 11 and 14 and driven thereby. Blade tension is adjusted by mechanism (not shown) acting on tubes 9. Shaft 13 carries multigrooved pulleys 16 connected and driven by endless belts 17 trained on the pulleys 18' of an electric motor 18 (see FIG. 2). Each electric motor 18 is suspended from a bracket 19 slidably mounted on slideway 20 extending longitudinally of frame 4 and connected to the end of the frame and to the cross beam 3.

A threaded rod 21, secured to bandmill base 7 and screwed in ears 22 secured to the bracket 19, serves to adjustably tighten belts 17. Each bandmill 1 and its driving electric motor 18 is adjustably displaced along slideways 23, 24 and slideway 20 respectively by conventional means (not shown). Stops 42 at the ends of beam 2 limit the movement of bandmills 1.

In accordance with the invention, the beam 2, which is preferably made of two channels welded together to form a hollow beam of rectangular cross section, is provided on at least one side thereof with lower and upper slideways 23 and 24 in the form of bars extending longitudinally of the beam 2 and protruding from the top, the bottom and the sides of beam 2.

The side of the base 7 of each bandmill 1 is recessed to form top and bottom shoulders 27 to which are bolted upper and lower flange plates 25 and 26 respectively, which engage the inside of the slideways 24 and 23, while the edges and sides of the slideways are slidably engaged by shoulders 27.

Thus, the bandmills are slidably mounted on each side of the beam 2 in cantilevered manner. The shoulders 27 together with the flange plates 25, 26 and the slideways 23 and 24, are machined to close tolerances for smooth and accurate transverse movement of the bandmills assemblies.

Referring to FIG. 2, it will be noted that the length of the base 7 of each bandmill, together with their flanges 25, is shorter than the diameter of the saw blade support wheels 11 and 14, whereby the active run of the saw blades 15 of a pair of bandmills can be moved very close together, for instance three-eights inch apart. This minimum distance depends only on the thickness of the saw guides 28 which may abut each other when adjustably mounted at the same level. Said saw guides are mounted for up and down movement on the columns 8 of the bandmills 1 in conventional manner.

As shown in the drawings, there are a pair of bandmills mounted on each side of beam 2, which thus support four bandmills. Obviously, the arrangement may consist of only two bandmills mounted on one side or on each side of beam 2.

Feed roll assemblies are supported by frame 4 at substantially the center thereof and comprise an infeed and an outfeed roll assembly 29 and 30. Each feed roll assembly comprises an open ended case A including upstanding spaced side plates 31 secured together by crossmembers 31' and 31" and between which are journaled a pair of lower knurled rolls 32, and an upper pressure knurled roll 33. The latter is mounted at the end of levers 34 pivoted at 35 to the side plates 31, the top roll 33 being movable up and down by an air cylinder 36, or the like, so as to engage the logs or cants.

The rolls 32, 33 are driven by suitable driving means (not shown).

The characteristic feature of the infeed and outfeed roll assemblies resides in the fact that each case A is mounted for movement on frame 4 towards and away from bandmills 1.

In the embodiment shown in FIG. 3, the bottom of case A is mounted in slides 37 and actuated for movement towards and away from the bandmills by a double acting air cylinder 38 connected to the main frame 4 at one end and to the case A at the other end.

In the embodiment shown in FIG. 5, the entire case A is pivotally connected to a pair of parallel links 39 at 40, said links being in turn pivotally connected to main frame 4 at their lower ends at 41, whereby the entire assembly forms a parallelogram system movable in a vertical arcuate path whereby case A can take a position close to the bandmills 1, shown in dot and dash lines, for normal operation and a retracted position shown in full lines.

The feed roll assemblies are retracted to give access to the saw blades 15 for removal of the same, when necessary.

Because the feed rolls in operative position are very close to the saw blades 15, the logs or cants are firmly guided at a point very close to the saw blades and, therefore, the sawing operation is effected in a very accurate manner.

When four saw blades are used, they are positioned at different stations transversely of the infeed and outfeed roll assemblies to saw boards of different thicknesses from the log or cant.

I claim:

1. In a bandmill assembly for making multiple cuts lengthwise through an elongated work piece moving end first through the bandmill assembly, at least two bandmills including a frame, top and bottom wheels carried by said frame, an endless saw blade trained on said wheels, motor means to rotate one of said wheels, a mounting for said bandmill comprising a substantially horizontal beam, means to support said beam near its ends, said frame of each bandmill extending above and below said beam on one side thereof, said beam providing top bottom and side surfaces, upper and lower horizontally extending slideways carried by said beam in spaced superposed relationship, said upper slideway protruding upwardly from said beam top surface and said lower slideway protruding downwardly from said beam bottom surface to provide at least three exposed surfaces for each slideway, said exposed surfaces of said upper slideway comprising a top surface, an inner side surface and an outer side surface, said exposed surfaces of said lower slideway comprising a bottom surface, an inner side surface and an outer side surface, said frame having superposed shoulders on only one side thereof, retaining members removably secured to each side of said shoulders, said shoulders and retaining members slidably engaging said exposed surfaces of said slideways, whereby said frame is slidably supported in cantilevered fashion on said beam, the other side of said frame being free of any contact with a supporting structure, said two bandmills being movable towards and away from each other, transverse to the line of feed of said elongated work piece.

2. In a bandmill assembly as claimed in claim 1, wherein said two superposed slideways are carried along one side of said beam and further including two additional superposed slideways carried at the other side of said beam, similar to the first-named slideways, and further including two additional bandmills being mirror images of the first-named two bandmills with their frames extending above and below said opposite side of said beam and having shoulders and retaining members engaging the exposed surfaces of said additional slideways, whereby said additional bandmills are slidably supported in cantilevered fashion on said same beam, but on the opposite side thereof, and are movable towards and away from each other in a direction transverse to the line of feed of said elongated piece.

3. In a bandmill assembly as claimed in claim 1, further including two feed roll assemblies and supporting structures therefor, said feed roll assemblies mounted across the line of feed of said elongated work piece on the infeed and outfeed sides of said saw blades, each feed roll assembly comprising a case, spaced power operated horizontally disposed feed rolls rotatably mounted in said case and arranged to feed said elongated work piece to the saw blades of said bandmills, at least one of said feed rolls in said case being mounted for vertical movement towards and away from the other feed rolls to accommodate work pieces of different cross-sectional sizes, said case being mounted on its associated supporting structure for bodily movement towards and away from the saw blades of said bandmills in a direction along the line of feed of said work piece, so as to take an operative position close to the said bandmills, for moving work pieces to said saw blades and a retracted position away from said saw blades and bandmills to allow replacement of said saw blades.

4. In a bandmill assembly as claimed in claim 3, further including a pair of feed roll assemblies and supporting structures therefor, said feed roll assemblies disposed across the line of feed of said elongated work piece, each feed roll assembly comprising a case, a pair of lower horizontally disposed feed rolls rotatably mounted in said case, an upper horizontally disposed feed roll rotatably mounted on said case, means to move said upper feed roll vertically towards and away from said lower feed rolls to accommodate work pieces of different cross-sectional sizes, the axes of rotation of said feed rolls being parallel to the long axis of said beam, said case movably mounted on said supporting structures for movement towards and away from the saw blades of said bandmills in the direction of the line of feed, and power means to move and block said cases in an advanced position with said feed rolls close to said saw blades and to block said cases in retracted position to make space between said feed rolls and said bandmills for the removal of the saw blades from said top and bottom wheels.

5. An assembly of bandmills comprising a frame adapted to be supported in horizontal position, a horizontal beam carried by said frame, slideways carried by at least one side of said beam, bandmills each having a base formed with a recess on one side thereof for engaging said slideways, flange members removably secured to the sides of said recess and engaging said slideways on the inside thereof, whereby said bandmills are slidably supported by said beam in cantilevered fashion, feed roll assemblies carried by said frame, each feed roll assembly mounted on said frame for movement towards and away from said bandmills in a direction substantially perpendicular to said horizontal beam and further including levers disposed in vertical planes and pivotally attached to said frame and to said feed roll assemblies for movement of the latter in a vertical path between advanced and retracted positions at rest on said frame.